2,897,180

METHOD FOR THE PREPARATION OF IMPROVED RESINOUS POLYALCOHOLS AND COMPOSITIONS THEREBY OBTAINED

Alexander M. Partansky, Concord, and Paul G. Schrader, Antioch, Calif., assignors to The Dow Chemical Company, Midland, Mich., a corporation of Delaware No Drawing. Application January 26, 1956
Serial No. 561,683

15 Claims. (Cl. 260—58)

This invention relates to a method for the preparation of improved aryl hydroxy alkylene and hydroxyalkyl ethers of phenol-formaldehyde resins and has particular reference to the preparation of certain mixed poly-(aryl hydroxy alkylene and hydroxyalkyl ethers) of novolaks (herein referred to as polyalcohols) based essentially on the common, tri-functional phenol, $C_6H_5OH$. More particularly it relates to duplex etherified derivatives of phenolic novolaks prepared with styrene oxide and organic oxides selected from the group of organic epoxides consisting of alkylene oxides containing from 2 to 4 carbon atoms in their molecule; hydroxy alkylene oxides containing from 3 to 5 carbon atoms in their molecule; and aryl glycidyl ethers. The invention is also concerned with the improved compositions which may advantageously be obtained by the practice of such a method.

It would be desirable to prepare resinous polyalcohol materials from novolaks, which polyalcohol materials could be esterified with drying or semi-drying oil fatty acids for employment in oleoresinous types of coatings having exceptional chemical and solvent resistance, particularly to caustic and alkali solutions, and being imbued with other desirable characteristics. It would also be advantageous for such materials to be available in a form provided by a greater and frequently substantially complete degree of etherification between the reactant ingredients. The accomplishment of these and other ends is among the principal objectives and advantages of the present invention.

According to the present invention, improved resinous polyalcohols having the desired characteristics may be prepared by reacting, in the presence of a strong base and at a temperature between about 100 and 220° C., a novolak made from the common phenol, $C_6H_5OH$, and formaldehyde and containing from three to ten phenolic units in its molecule with a quantity of styrene oxide and then with a quantity of a relatively more reactive organic oxide selected from the group of organic epoxides consisting of alkylene oxides containing from 2 to 4 carbon atoms in their molecule; hydroxy alkylene oxides containing from 3 to 5 carbon atoms in their molecule; and aryl glycidyl ethers, to etherify at least about 70 percent of the phenolic hydroxyl groups originally present in the novolak. Advantageously the reaction may be conducted while the novolak is dispersed or dissolved in a suitable, inert solvent such as dioxane and the like. Frequently, it is more beneficial to conduct the reaction at a temperature between about 110 and 130° C., particularly during the etherification with styrene oxide, to avoid formation of undesirable by-products, particularly of such materials as polymerized styrene oxide and the like. Highly etherified compositions, which advantageously may often be prepared in a completely etherified condition, may be obtained according to the method of the present invention.

Generally the reaction may be conducted suitably when at least about 0.05 mole but not in excess of about 1.0 mole of the styrene oxide are initially employed for etherifying each phenolic hydroxide of the novolak condensate followed by sufficient quantities, usually between about 1.2 and 0.25 moles of the more reactive oxide in order, figuratively speaking, to "scavenge" the unetherified phenolic hydroxy groups and to insure the minimum desired 70 percent etherification. More advantageously, the reaction may be conducted by initially employing between about 0.3 and 1.0 mole of the styrene oxide for each phenolic hydroxide of the novolak followed by sufficient quantities, usually between about 0.8 and 0.2 mole of the more reactive oxide to insure a substantially complete etherification. It is preferable for not more than about 1.25 moles of both oxides to be employed for each phenolic hydroxide. Usually, the entire reaction is completed within about 60 hours although in many instances reaction periods as short as 12 hours and less may be sufficient in order to obtain satisfactory results. The styrene oxide etherification portion of the reaction varies, of course, with the reaction conditions and the relative amount of styrene oxide which is desired to be etherified in the resinous polyalcohol. Advantageously, the etherified product consists of a novolak in which each phenolic unit is etherified with from about 0.1 to 1.0 mole of styrene oxide and with from about 1.0 to 0.1 mole of the more reactive oxide, with the product being etherified with a sum total of not more than about 1.5 moles of both oxides per phenolic unit. More advantageously, each phenolic unit in the product is etherified with from about 0.3 to 0.8 mole of styrene oxide and with from about 0.7 to 0.2 mole of the more reactive oxide with a sum total of not more than about 1.25 moles of both oxides per phenolic unit. It is even more beneficial when the product has been etherified with a sum total of not more than about 1.1 moles of both oxides per phenolic unit in the novolak.

The strong base employed as a catalyst for the reaction is preferably an alkali metal hydroxide such as sodium or potassium hydroxide which, advantageously, is employed in an amount between about 0.2 and 1.5 percent by weight, based on the weight of the novolak which is present in the reaction mass.

In preparing the polyalcohols it is preferable to employ any novolak having the indicated molecular characteristics which is based on formaldehyde and common phenol, $C_6H_5OH$, regardless of the particular method which is employed for its manufacture. Thus, the novolak may be made under reflux conditions at atmospheric pressure, in the conventional manner, or it may be made at elevated temperatures and pressures, particularly according to the procedures described in the copending applications Serial Nos. 382,851, Patent No. 2,838,473 and 382,852, now abandoned, both filed September 28, 1953, in both of which at least one of the present inventors is a coapplicant. The optimum molecular ratio of aldehyde to phenol which may be employed in manufacturing the novolaks varies somewhat with the particular method which is utilized. Generally the ratio falls between about 0.65 and 0.95 mole of aldehyde per mole of phenol with greater advantages being frequently obtainable when the ratio is between about 0.75 and 0.85. Usually the novolaks may be prepared by condensing the aldehyde and phenol in the presence of an acid catalyst, such as oxalic, hydrochloric, phosphoric, or sulfuric acids. Sometimes, however, useful products may be obtained from alkali-catalyzed condensations.

Novolaks prepared from the common, $C_6H_5OH$, phenol are preferred not only for reasons of economy and availability but also because of the difficulties, ordinarily due to steric hindrance, which may be encountered when novolaks from substituted phenols are employed and attempted to be etherified with styrene oxide. However, novolaks in which minor amounts of substituted phenols are present in the condensed product may frequently be employed, provided the substituents are not available in such relative proportions as might give rise to steric obstructions to the desired reaction with styrene oxide.

The following examples illustrate the practice of the present invention.

EXAMPLE I

A novolak was prepared from common phenol with about 0.82 mole of formaldehyde per mole of phenol in the presence of about 1.0 percent of phosphoric acid, based on the weight of the phenol, and water in an amount by weight about one and one-half times the amount of the phenol. The reaction was conducted in a Pfaudler reactor at elevated temperatures and pressures according to the procedure set forth in copending application Serial No. 382,852, filed September 28, 1953. After being neutralized, purified and dried, about 500 grams of the novolak was dissolved in about 500 grams of dioxane to which was added about 14.5 grams of an alcoholic solution of potassium hydroxide containing about 2.5 grams of KOH. The mixture was placed in a high pressure, rocking-type laboratory reactor wherein about 404 grams of styrene oxide, which constituted about 0.71 mole of the oxide per hydroxyl equivalent of the novolak, was added. The mixture was heated for 40 hours at a temperature in the neighborhood of 110–115° C. At the end of this initial period of the reaction, the temperature was raised to 150° C. and about 85 grams of ethylene oxide, constituting about 0.40 mole per novolak equivalent, was added. Heating was continued at a temperature of about 155° C. for an additional five hour period, after which the reaction mass was cooled, neutralized with citric acid, devolatilized to free the polyalcohol from solvent and then washed with water. There was obtained a resinous polyalcohol having a molecular weight of about 990 and an equivalent weight of about 214 grams per alcoholic hydroxyl group.

An ester was prepared with the polyalcohol by cooking together about 129 grams of the polyalcohol with about 121 grams of soya oil fatty acids under a nitrogen atmosphere for about 7.5 hours at about 230° C. The amount of oil fatty acid used was about 0.7 of the amount theoretically equivalent to the alcohol groups in the polyalcohol. The residual acid number of the cooked mass was found to be about 7.7 and the viscosity of a 70 percent solution of the ester in xylene (at room temperature) was about 1000 centipoises. The color of the 70 percent xylene solution was about 13 on the Gardner color scale. Films of this ester dried in air to give tough, lightly colored coatings having a Sward Rocker hardness, when dried, of about 22 and color rating of about 3 on the Gardner color scale. The air dried coatings had good resistance to a 2 percent by weight aqueous solution of caustic soda, withstanding seven days' immersion in such a solution before disintegrating. A film of the ester baked for 30 minutes at 150° C., having a Sward hardness of 24, remained clear, strong and tough after 2 weeks of the same exposure.

EXAMPLE II

When the procedure of Example I was repeated excepting that 1.0 mole of styrene oxide per novolak hydroxyl equivalent was reacted for a 24 hour period at a temperature of about 120° C. and about 0.1 mole of the ethylene oxide per novolak hydroxyl equivalent was reacted for 3 additional hours at about 140° C. and 1.0 percent by weight of the potassium hydroxide catalyst, based on the weight of the novolak, was employed, there was obtained a polyalcohol product having a molecular weight of about 1290 and an hydroxyl equivalent weight of about 268 grams. Similar results to those of Example I were obtained with film coatings consisting of soya oil fatty acid esters of the polyalcohol.

EXAMPLE III

The procedure set forth in Example I was repeated identically excepting that the initial addition of styrene oxide was only about 202 grams (0.35 mole per hydroxyl equivalent weight of the novolak) and the heating was conducted in the neighborhood of 110–115° C. was for about 48 hours. The etherification-completing alkylene oxide which was employed was propylene oxide. It was added in an amount of about 209 grams, which constituted about 0.75 mole of propylene oxide per hydroxyl equivalent weight of the novolak. The hard, brittle resinous polyalcohol obtained had a cryoscopic molecular weight of about 1180 and a hydroxyl equivalent weight of 193. The yield which was obtained of this polyalcohol was in the amount of about 863 grams.

An ester was prepared by heating about 122 grams of the polyalcohol together with 128 grams of soya oil fatty acids for 8.75 hours at 235° in an inert atmosphere. About 0.7 of the theoretical amount of fatty acid was employed. After being cooked, the esterified mass had an acid number of 11.7 and a viscosity of about 1600 centipoises, when dissolved in xylene to obtain a 70 percent by weight solution. The color of the xylene solution was 13 on the Gardner scale. Air dried and baked coatings of the film had about the same hardness and caustic resistance as the film obtained in Example I excepting that the dried film was lighter, having a Gardner color of 2.

EXAMPLE IV

A novolak having a molecular weight of about 800 was prepared in a pressure vessel by reacting, at 150° C. for one hour, about 8235 grams of common phenol with about 5900 grams of 37 percent formalin (to provide an aldehyde to phenol ratio of about 0.82) in the presence of about 8590 milliliters of supplementary water and about 82.4 grams of phosphoric acid containing about 85 percent by weight of $H_3PO_4$. After being reacted, the novolak-containing mass was cooled to about 80° C., neutralized with caustic solution, washed four times with distilled water and devolatilized. About 3395 grams of the novolak, dissolved in about 2500 grams of dioxane, was placed in a pressure reactor. About 34 grams of a 50 percent aqueous solution of potassium hydroxide and about 3880 grams of styrene oxide were then added to the reactor. The reaction mass was maintained at a temperature of about 120° C. for a reaction period of about 24 hours. About 728 grams of phenyl glycidyl ether was then introduced into the reacted mass and heating was continued for an additional four hours at a temperature of about 140° C. in order to scavenge the unreacted hydroxyl groups in the already etherified polyalcohol. The reaction mass was then cooled to about 80° C. and neutralized with about 32 grams of citric acid. The dioxane solvent was removed by distillation and the remaining polyalcohol was washed with four two-gallon volumes of distilled water and dried under a vacuum. The cryoscopic molecular weight of the polyalcohol was found to be 1490. It had an hydroxyl equivalent weight of 230.

An ester was prepared by heating about 107 grams of the polyalcohol with about 93 grams of soya oil fatty acids under a nitrogen atmosphere for about 5.3 hours at a temperature of about 240° C. The amount of fatty acid used was 0.7 of the amount theoretically equivalent to the alcohol groups in the polyalcohol. The residual acid number of the prepared mass was found to be about 9.5 and the viscosity of a 70 percent solution of the ester in xylene (at room temperature) was about 1100 centipoises. With addition of conventional metallic driers, a film of the oil which had been cast on a glass plate to have a thickness of about 3 mils, dried to a tack-free or dry-to-touch state in air at room temperature within 2.75 hours. The color of the dried film on the Gardner scale was 2. The air dried film had a Sward hardness of about 24. Another film of the ester, baked on a glass plate for 30 minutes at 150° C. had a Sward hardness of about 26. Both films had excellent resistance to caustic alkali solutions.

EXAMPLE V

Results similar to those in the foregoing examples may be obtained when hydroxy propylene oxide is employed as the more reactive organic oxide to complete the etherification following the initial etherification with styrene oxide.

EXAMPLE VI

Various styrene oxide-containing polyalcohols, prepared according to the general procedure set forth in the first four examples, were obtained under conditions and had properties as are detailed in and by the following table. All of the polyalcohols involved were prepared from a similar novolak condensate as that employed in Example IV.

which is not to be construed as being limited or restricted thereby excepting as it is set forth and defined in the appended claims.

What is claimed is:

1. Method which comprises etherifying a phenol-formaldehyde novolak which is based essentially on the common, tri-functional phenol, $C_6H_5OH$, and which has from three to ten phenolic units per molecule, in the presence of between about 0.2 and 1.5 percent by weight, based on the weight of the novolak being etherified, of an alkali metal hydroxide catalyst and at a temperature between about 100 and 220° C. with, initially, for each phenolic unit in the novolak from about 0.05 to about 1.0 mole of styrene oxide and then with from about 1.2 to about 0.25 mole of a relatively more reactive organic

Table I

| Poly-alcohol | Novolak weight, gms. | Dioxane solvent weight, gms. | Catalyst | | | Oxide component | | | Reaction conditions | | Cryoscopic molecular weight | Hydroxyl equivalent weight, grams | Melting point, °C. |
|---|---|---|---|---|---|---|---|---|---|---|---|---|---|
| | | | Kind | Weight of 50 percent aq. soln., gms. | Percent by weight based on Novolak | Kind—St.[1] Et[2] | Weight of oxides, gms. | Ratio, moles oxide/equivalent of Novolak | Average temp., °C., and time, hrs. | Max. temp., °C., attained during reaction | | | |
| A | 7,710 | 3,855 | NaOH | 77.1 | 0.5 | {St / Et} | 881 / 3,410 | 0.10 / 1.05 | 117°/12.0 / 140°/ 4.75 | 118 / 162 | 1,205 | 161 | 82 |
| B | 7,500 | 4,800 | KOH | 150 | 1.0 | {St / Et} | 2,150 / 2,680 | 0.25 / 0.85 | 115°/24.0 / 140°/ 5.66 | 116 / 154 | 1,305 | 159 | 88 |
| C | 6,745 | 5,000 | KOH | 140 | 1.04 | {St / Et} | 3,860 / 1,850 | 0.50 / 0.85 | 115°/24.0 / 140°/ 4.58 | 116 / 157 | 1,330 | 189 | 89 |
| D | 500 | 500 | KOH | 5.0 | 0.5 | {St / Et} | 404 / 85 | 0.70 / 0.40 | 105°/40.0 / 155°/ 5.75 | | 990 | 214 | |
| E | 5,500 | 5,500 | KOH | 110 | 1.00 | {St / Et} | 6,280 / 576 | 1.00 / 0.25 | 120°/24.0 / 150°/ 3.33 | | 1,635 | 234 | 95 |

[1] Styrene oxide.
[2] Ehtylene oxide.

Various oil fatty acid esters made from the polyalcohols prepared as set forth in Table I provided excellent caustic resistant films. This is indicated in the following table, which also includes details relating to the preparation of each film.

oxide selected from the group or organic epoxides consisting of alkylene oxides containing from 2 to 4 carbon atoms in their molecule; hydroxy alkylene oxides containing from 3 to 5 carbon atoms in their molecule; and aryl glycidyl ethers, and continuing the reaction until

Table II

| Fatty acid ester | Poly-alcohol (see Table I) | Weight of polyalcohol grams | Oil fatty acids charged | | | | Cooking schedule temp., °C., and time, hrs. | Final acid number of ester | Viscosity of ester in 70 percent xylene solution, cps. | Tack-free drying time, hrs. | Gardner color of dried film | Sward hardness | | Caustic resistance | |
|---|---|---|---|---|---|---|---|---|---|---|---|---|---|---|---|
| | | | Type of oil fatty acid | Weight of acid, grams | Percent by weight of F.A. in charge | Moles fatty acids per alcoholic equiv. weight | | | | | | Air dried | Baked 30 min. at 150° C. | Air dried (hr.=hours, da.=days) | Baked 30 min., 150° C. |
| G | A | 89 | Soya | 111 | 55.5 | 0.7 | 239°/6.00 | 2.1 | 600 | 1.25 | 1 | 20 | 12 | 1 hr. to 1 da | 1 hr. to 1 da. |
| H | B | 88 | do | 112 | 56.0 | 0.7 | 240°/3.75 | 3.7 | 620 | 0.75 | 2 | 9 | 9 | 1 da. to 7 da | 1 da. to 7 da. |
| I | B | 141.5 | Linseed | 208.5 | 59.5 | 0.8 | 230°/3.00 | 7.0 | 700 | 0.72 | 2 | 16 | 13 | 1 da. to 7 da | 1 da. to 7 da. |
| J | B | 182.5 | do | 167.5 | 48.0 | 0.5 | 240°/1.25 | 4.9 | 2,300 | 0.67 | 3 | 27 | 43 | 1 da. to 7 da | 1 da. to 7 da. |
| K | C | 160 | do | 190 | 54.3 | 0.8 | 240°/2.83 | 11.0 | 2,400 | 1.83 | 2 | 29 | 25 | 1 da. to 7 da | 11 da. to 14 da. |
| L | C | 687 | do | 513 | 42.7 | 0.6 | 240°/2.18 | 6.3 | 4,000 | 0.83 | 3 | 40 | 42 | 1 da. to 7 da | 21 da. to 28 da. |
| M | D | 129 | Soya | 121 | 48.4 | 0.7 | 230°/7.50 | 7.7 | 1,000 | 4.50 | 3 | 22 | 24 | >14 da. | |
| N | E | 107.5 | do | 92.5 | 46.3 | 0.7 | 240°/3.00 | 0.6 | 3,000 | 2.67 | 4 | 28 | 31 | 1 da. to 7 da | 7 da. to 14 da. |

The styrene oxide-containing polyalcohols of the present invention are especially well suited for employment in oleoresinous films when the films are in accordance with the disclosure contained in the copending application of Alexander M. Partansky having Serial No. 561,660, which was concurrently filed January 26, 1956.

Since certain changes and modifications can be readily entered into in the practice of the present invention without substantially departing from its intended spirit and scope, it is to be fully understood that all of the foregoing description and specification be interpreted as being merely illustrative of preferred embodiments of the invention at least about 70 percent of the phenolic hydroxyl groups originally present in the novolak are etherified.

2. The method of claim 1 wherein between about 0.3 and 1.0 mole of styrene oxide and between 0.8 and 0.2 mole of the more reactive organic oxide are employed per phenolic unit in the novolak and wherein the reaction is continued until substantially all of the phenolic hydroxyl groups originally present in the novolak are etherified.

3. The method of claim 1 wherein not more than a total of about 1.25 moles of both oxides are employed per phenolic unit in the novolak and wherein the reaction is continued until substantially all of the phenolic hydroxyl groups originally present in the novolak are etherified.

4. The method of claim 1 wherein the novolak is etherified initially with styrene oxide at a temperature between about 110 and 130° C.

5. The method of claim 1 wherein the temperature is between about 110 and 130° C.

6. The method of claim 1 wherein the catalyst is an alkali metal hydroxide employed in an amount between about 0.2 and 1.5 percent by weight, based on the weight of the novolak being etherified.

7. The method of claim 1 wherein the more reactive organic oxide is ethylene oxide.

8. The method of claim 1 wherein the more reactive organic oxide is propylene oxide.

9. The method of claim 1 wherein the more reactive organic oxide is phenyl glycidyl ether.

10. A resinous polyalcohol consisting of the etherified product of a phenol-formaldehyde novolak which is based essentially on the common, tri-functional phenol, $C_6H_5OH$, and which has from three to ten phenolic units per molecule and for each phenolic unit present in the novolak, is etherified with from about 0.1 to 1.0 mole of styrene oxide and from 1.0 to 0.1 mole of a relatively more reactive organic oxide selected from the group of organic epoxides consisting of alkylene oxides containing from 2 to 4 carbon atoms in their molecule; hydroxy alkylene oxides containing from 3 to 5 carbon atoms in their molecule; and aryl glycidyl ethers, wherein the product is etherified with a total of not more than about 1.5 moles of both oxides per each phenolic unit and at least about 70 percent of the phenolic hydroxyl groups originally present in the molecule are etherified.

11. A resinous polyalcohol in accordance with claim 10 wherein the etherified novolak product, for each phenolic unit present in the novolak is etherified with from about 0.3 to 0.8 mole of styrene oxide and from about 0.7 to 0.2 mole of the more reactive organic oxide and wherein the product is etherified with a total of not more than about 1.25 moles of both oxides per each phenolic unit and substantially all of the phenolic hydroxyl groups originally present in the novolak are etherified.

12. A resinous polyalcohol in accordance with claim 10 wherein the etherified novolak product is etherified with not more than a total of about 1.1 moles of both oxides per phenolic unit in the novolak and wherein substantially all of the phenolic hydroxyl groups originally present in the novolak are etherified.

13. A resinous polyalcohol in accordance with claim 10 wherein the more reactive organic oxide is ethylene oxide.

14. A resinous polyalcohol in accordance with claim 10 wherein the more reactive organic oxide is propylene oxide.

15. A resinous polyalcohol in accordance with claim 10 wherein the more reactive organic oxide is phenyl glycidyl ether.

References Cited in the file of this patent

UNITED STATES PATENTS

| | | |
|---|---|---|
| 2,499,365 | De Groote | Mar. 7, 1950 |
| 2,705,704 | Sorenson | Apr. 5, 1955 |